United States Patent [19]

Pekelman

[11] Patent Number: 6,069,707
[45] Date of Patent: May 30, 2000

[54] SYSTEM FOR REPRODUCING A PHYSICAL COLOR IMAGE

[76] Inventor: Gil Pekelman, 2 Harimon St., 48571 Rosh Ha'ayin, Israel

[21] Appl. No.: 08/912,401

[22] Filed: Aug. 18, 1997

Related U.S. Application Data

[63] Continuation-in-part of application No. 08/718,250, Sep. 20, 1996.

[51] Int. Cl.$^7$ ..................................................... G06F 15/00
[52] U.S. Cl. ........................ 358/1.6; 358/1.13; 358/1.15; 358/296; 358/1.9; 399/16
[58] Field of Search ..................................... 395/106, 109, 395/114, 117; 358/296, 298, 1.6, 1.4, 1.9, 1.13, 1.14, 1.15, 1.18; 355/208, 311, 325, 19, 23, 32, 48; 399/16, 17, 82, 151

[56] References Cited

U.S. PATENT DOCUMENTS

| | | | |
|---|---|---|---|
| 5,481,353 | 1/1996 | Hicks et al. | 355/311 |
| 5,510,896 | 4/1996 | Wafler | 358/296 |
| 5,819,014 | 10/1998 | Cyr et al. | 395/114 |
| 5,854,882 | 12/1998 | Wang | 395/109 |

*Primary Examiner*—Edward L. Coles
*Assistant Examiner*—Mark Wallerson
*Attorney, Agent, or Firm*—Mark M Friedman

[57] ABSTRACT

A system that enables quickly, reliably and automatically producing quality copies of a physical color image, utilizing an available digital printer or digital press. The system consists of a scanner and a digital processor, commonly housed and interfaced to the printer, and an integrated software package. It features a novel image processing flow, whereby scanning, processing and outputting to the printer proceed as a continuous sequence of operations on the image data, without any intermediate files being created and without any intervention by the operator of the system. Scanning, processing and printing of different images may take place simultaneously in a pipeline fashion.

35 Claims, 9 Drawing Sheets

SYSTEM FOR REPRODUCING A PHYSICAL COLOR IMAGE

This is a continuation-in-part of U.S. Ser. No. 08/718,250 filed Sep. 20, 1996.

FIELD AND BACKGROUND OF THE INVENTION

The present invention relates to a system for reproducing a color image by means of a digitally fed printer and, more particularly, to a system that can scan an original image, present on a physical medium, and print multiple copies thereof by means of an independent digitally fed printer, such as a digital press.

Presently there are two major types of digital color image reproduction systems: One type is generally known as publishing system and may encompass many configurations and levels of operation; in one class of configurations it is known as color electronic prepress system (CEPS) and in another, widespread class it is known as desktop publishing system (DTP). The primary purpose of systems of this type is to digitally compose a ready-to-print image of one or more pages out of a variety of graphical elements, such as text, drawings and pictures. The graphical elements are fundamentally obtained from two types of sources—physical images and computer generated data. Source physical images are usually photographs (transparencies or opaque prints) but may sometimes also be press-printed pictures or drawings on physical media. Image elements from computer generated data range widely from text, through 2-D graphics, to renderings of 3-D objects. A typical DTP system is illustrated schematically in FIG. 1. Physical images are usually scanned by a scanner and converted to digital raster representation, in which form they are stored, alongside the data of the computer generated elements. Typically, each element is called up and possibly edited, using specialized application SW. In particular, raster images from physical sources may undergo various editing functions, which aim at improving, or even altering, the resultant image. Then, typically, the various elements are assembled together, by means of a page assembly application SW and under interactive control of an operator. The outcome of this is a page description file. One or more page description files are fed to a so-called raster-image processor (RIP), which outputs a complete output description file (or output file, for short) of a printed sheet in a raster format compatible with the printer to be used. Generally, any of a variety of printing devices may be used—from a desktop digital printer to a digital color press. The output file is fed to a print buffer in the printer or in the digital press, from where it is repeatedly fed to the printing engine to produce multiple copies of the sheet image. (More generally, such a file may also be fed to an imagesetter or a platesetter, to produce printing plates for conventional presses). Although the various processing functions may be carried out on a single computer, they are usually divided between a number of platforms, either because of the physical separation of the functions, due to practical workflow (which underlies the flexibility of DTP systems), or in order to maximize overall processing rate; in particular, the RIP function is often carried out in a dedicated platform—especially for high-quality or high-volume printing, such as is done in digital presses.

Sometimes, as is the situation underlying the present invention, a complete page image may already exist on a physical medium and it is desired to reproduce it, that is—to obtain printed copies thereof. In particular cases, such an image may consist of a single picture, which exists as a photographic print or transparency. A digital publishing system, as described hereabove, can be utilized for the purpose. However, since such a system is designed to carry out many more functions, it involves several stages of processing, as outlined above, which are interspersed with storage of files and require operator intervention to at least initiate, and possibly also control, each stage. Hence, its use for such a purpose is highly disadvantageous because—

(a) it is very costly and inefficient in terms of operator time and use of computer resources;

(b) it takes a relatively long time to obtain a first copy;

(c) it is prone to human errors—resulting in further prolongation of the time to first copy and/or in poor image quality.

The other major type of digital color image reproduction system is represented by so-called color copiers. A typical color copier is schematically illustrated in the block diagram of FIG. 2. It consists primarily of a scanner, an image processor, an image buffer memory and a printer. The original image-carrying medium is scanned by the scanner, the resulting digital image data is processed, so as to optimize the image and to convert the color components, then fed through the buffer memory to the printer. Operation of a copier is largely automatic and is internally controlled (e.g. by the controller block in the illustration)—possibly according to parameters input by an operator through a user interface. Characteristically, all the HW components are housed in a single unit and the printer is the exclusive printing device. Also characteristically, the printer is matched to the scanner in scan-line frequency (typically 300–400 LPI) and in operational speed (since, in most cases, only a single copy or a very small number of copies is made from each original).

Color copiers are inherently suitable for carrying out reproduction of a physical page image (which is the subject of the present invention), overcoming the disadvantages, enumerated above, of using a publishing system for the purpose. However, they have several disadvantages, when compared to using a publishing system in conjunction with a typical digital press, some or all of which may be significant in particular practical cases, namely—

(a) lower printing speeds—typically three full-color copies per minute;

(b) lower printed image quality (compared to most digital presses);

(c) printing on a limited choice of media types—primarily medium-weight uncoated paper (in contrast to the variety of print media, including a large range of papers—from light uncoated to heavy coated and glossy, handled by digital presses);

(d) construction as a compact office machine, for non-continuous operation, rather than for high volume production—which usually shortens MTBF and requires frequent service.

In certain types of business locations where the need for a physical image reproduction system could arise, there may already be a digital color printer, such as a typical office printer, installed. Such a printer would normally serve to print images prepared in a publishing system (as described above). As pointed out, the use of the entire publishing system for the sole purpose of reproducing a physical image would be uneconomical and unsatisfactory. On the other hand, purchasing a copier for this purpose, in addition to the installed system, could also be uneconomical, since a copier includes both a scanner and a printer—two relatively costly components, while the printer is, in effect, superfluous. It would, in such a case be more economical to have a system available that includes only a scanner and the necessary image processor, which would utilize the existing printer to print copies, especially if the latter is not utilized all the time, as is the typical case. This is particularly true for color reproduction, since the prices of color copiers are relatively high. It may be argued that in such situations, the lower quality and speed of office printers (as compared to digital presses) may be acceptable for copying, as they are for publishing, and thus the relative disadvantages of office copiers (over the use of the combination of publishing system and digital press), mentioned above, are no longer valid. However, in these very situations, their inherent economic disadvantages, just discussed, may become of paramount consideration. It may be of note that similar economic considerations have already to led to an inverse solution, suitable for other business situations, namely: A copier is made to also function as an output printer, by attaching a suitable RIP, which is fed from a DTP.

There is thus a widely recognized need for, and it would be highly advantageous to have, a system that enables quickly, reliably and economically producing quality copies of a physical color image, utilizing an available digital printer or digital press.

SUMMARY OF THE INVENTION

The present invention successfully addresses the shortcomings of the presently known configurations by providing a system that enables quickly, reliably and automatically producing quality of copies of a physical color image, utilizing an available digital printer or digital press.

The present invention discloses a novel image processing flow, whereby scanning, processing and outputting to the printer proceed as a continuous sequence of operations on the image data, without any intermediate files being created and without any intervention by the operator of the system.

More specifically, the system of the present invention, in a preferred embodiment of one configuration, consists of hardware and software. The hardware includes a scanner, a high-performance computer and user interface devices, all preferably built into, or mechanically attached to, a single housing, as well as an interface to the printer—including connecting cable. The computer includes one or more fast general-purpose processors and, possibly, also one or more graphic, or other supplementary processors. The software includes, as primary modules, an overall controller, an image processor and interfaces to the scanner, the printer and the operator. In other configurations, the scanner and the computer may be provided separately, or they may already exist, as part of a different system. In yet other configurations, the computer may be a special-purpose module and/or some of the software functions may be realized by special hardware components.

The system is designed to automatically cause a physical image placed on the scanner to be scanned, process it, output it to the printer and cause the printer to print it, in a specified number of copies. This sequence of processes takes place without any intervention by the operator of the system after his issuing a copy command. Image processing proceeds as a continuous sequence of operations on the image data, without any intermediate files being created. At most, image data are temporarily, and transparently to the operator, stored in a buffer memory and the data for a complete image over the printed page area is stored in a final page buffer. The latter is ready for direct transfer to the printer, without further action by the operator. Scanning of one original image may be carried out simultaneously with the processing of one or more other (previously scanned) images and with the printing of a previously prepared page image.

Processing functions depend on the type of the original image, that is—whether the image consists primarily of solid graphics (such as text and lineart) or multi-level (multi-tone and color) images. In the former case, the processing is of binary-valued image data at full resolution and may include scaling and, possibly, coloring. In the latter case, it is of full triple-valued pixels and includes conversion to lower resolution, sharpening, conversion to printing ink densities representation and half-tone screening; it may also include scaling and rotating and some correction of tones and colors. If the original image is a half-tone print, initial processing also includes de-screening. If the original image is a composite of various types, an initial automatic segmentation process determines the type of each elementary section—to determine subsequent processing. Optionally, a printed page may be composed of several images—either duplicates of one original image or several original images, scanned sequentially. To the extend enable by the printer, or the digital press, duplex (two-sided) and/or collated printing are also supported.

Prior to issuing the copy command, the operator may optionally set parameter values (or alter default values) that affect subsequent scanning, processing and printing. For this operation, he may be aided by a displayed preview image, possibly obtained from a pre-scan of the original, setting parameters (such as cropping window, printed page layout and color/tone correction)—inter alia also interactively.

According to the present invention there is provided a system for reproducing one or more original physical images on a digital printer, operative to print multiple copies of a page image in a print raster and in a plurality of printing colors, the system comprising a scanner and a digital processor, connected to the scanner and to the digital printer and including storage, wherein the processor is programmed to automatically, after receiving a scan command from an operator—

—cause the scanner to scan the original images,

—process resultant image data so as to obtain a complete digital representation of the page image, the representation being stored in the processor at most once, —cause the representation to be transferred to the printer in a raster format that corresponds to the print raster, separated by printing colors, and —cause the printer to print the page image, and wherein data obtained from the scanner is the only image data contributing to the representation of the page image.

According to other features in the described preferred embodiments, the processor consists of conventional integrated-circuit devices, the printer is not mechanically attached to the scanner and to the processor and the system further comprises a housing, which houses the scanner and the processor in common.

According to further features in preferred embodiments of the invention described below, at any stage prior to the digital representation of the page image, any image data is formatted in a format that is not commonly used for transfer of image data or graphical information between systems and, if the digital printer includes a print buffer, the format that corresponds to the print raster includes encoding in essential conformance with the data encoding required by the print buffer.

According to still further features, processing of image data is carried out in its entirety according to a set procedure, which includes at least a first and a second subprocedure, in sequence, each associated with parameters, none of the parameters being alterable during said processing, the first subprocedure being associated with any single original image and the second subprocedure being associated with any single page image, and, furthermore, there being a limited number of types within and among all possible original images, the first subprocedure is divided into a plurality of paths, each corresponding to one of the types and associated with parameters, the original image, or a portion thereof, is classified as one of the types, to become a current type, and processing of data from the original image or from a portion thereof is carried out according to the path that corresponds to the current type, whereby image classification and parameter setting may be carried out automatically.

According to yet other features, the system further comprises an image display means and the processor is further programmed to be operative to— cause the scanner to prescan the original image, display on the image display means a preview image resulting from the prescanning, enable an operator to set or modify some or any of the parameters interactively with the preview image, to result in modified parameter values, and cause the modified parameter values to take effect when subsequently governing scanning and image processing, all such operations to be completed prior to reception of the scan command.

According to yet further features, scanning of any one image may occur simultaneously with processing of data of at least one other image and simultaneously with printing of a page containing data from one or more yet other images.

In various configurations of the system of the present invention, the printer may be a conventional color printer, a digital press or an offset press with a provision for on-press recording of images onto printing forms.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an image copying system (ICS) that enables quickly, reliably and economically reproducing a physical color image, utilizing an available digital printer.

Specifically, the present invention can be used to scan the original image, automatically process the resultant digital data and directly feed it to the printer so as to be printed in any number of copies. The invention is particularly useful when utilizing a high-quality and/or high-speed printer, such as a digital press, but is, in principle, applicable in conjunction with any printer.

The principles and operation of an ICS according to the present invention may be better understood with reference to the drawings and the accompanying description.

Figure 1:
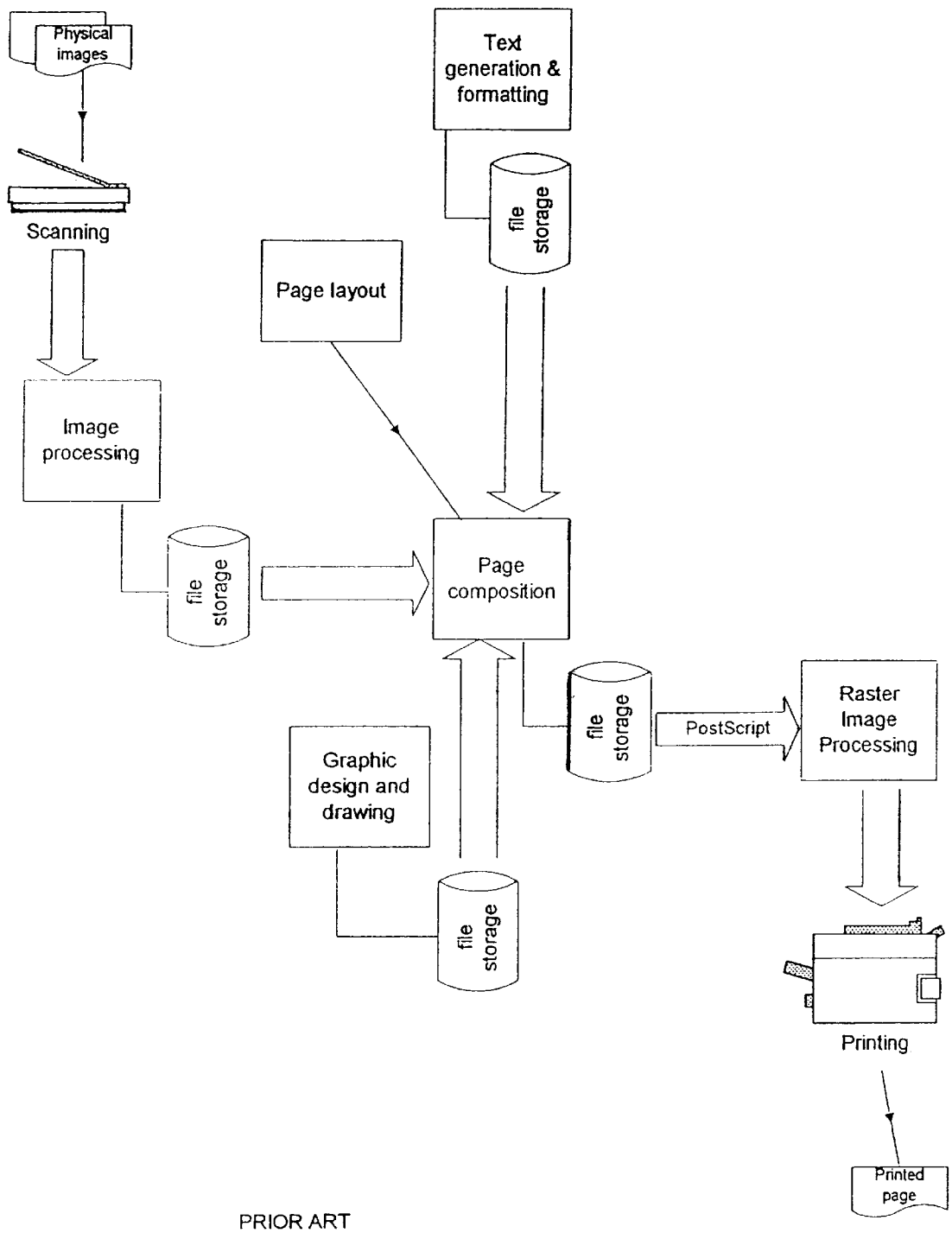
FIG. 1 is a schematic illustration of a desktop publishing system, which could be used for physical image reproduction according to prior art.
Figure 2:
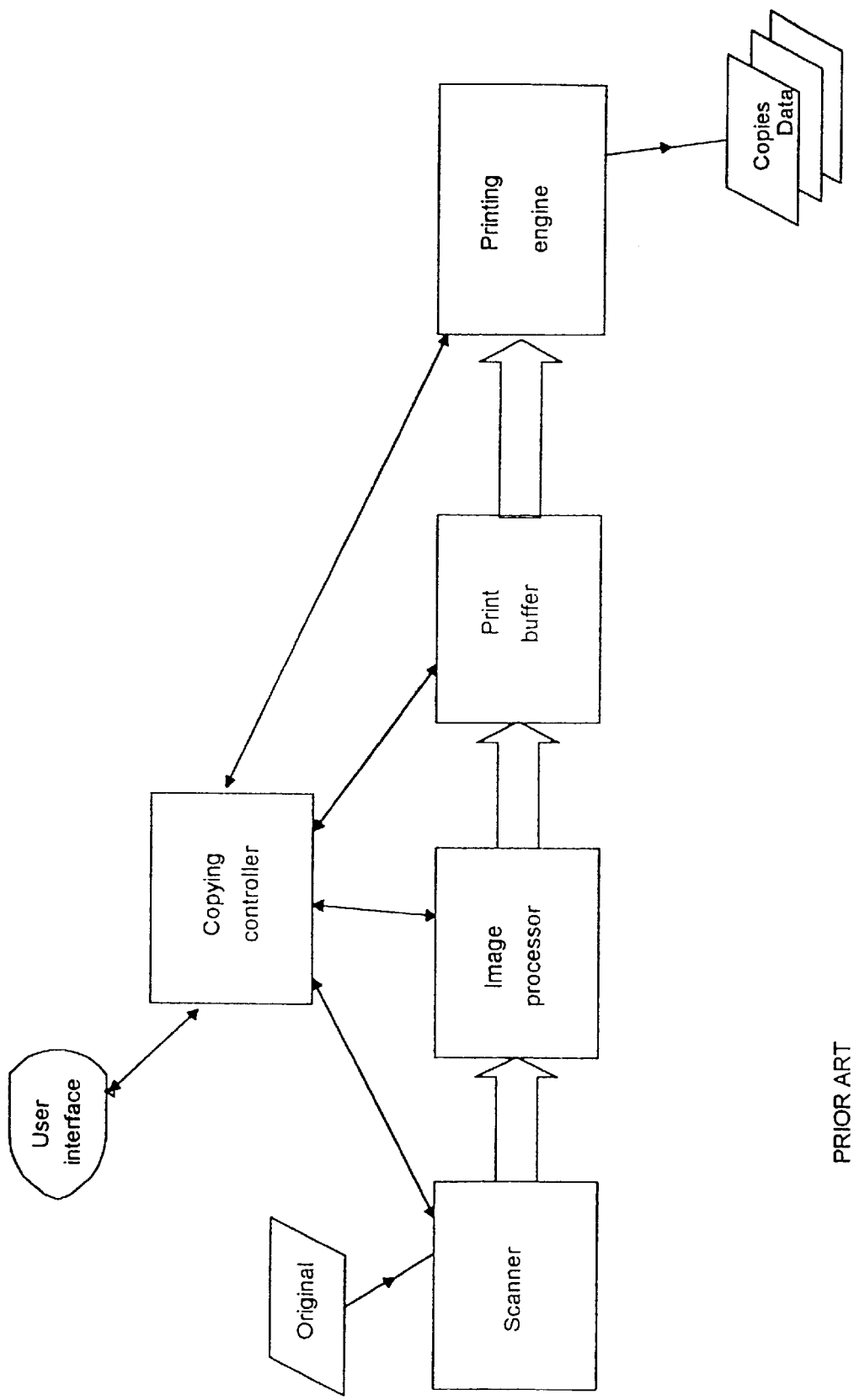
FIG. 2 is a schematic block diagram of a color copier, which could be used for physical image reproduction according to prior art.
Figure 3:
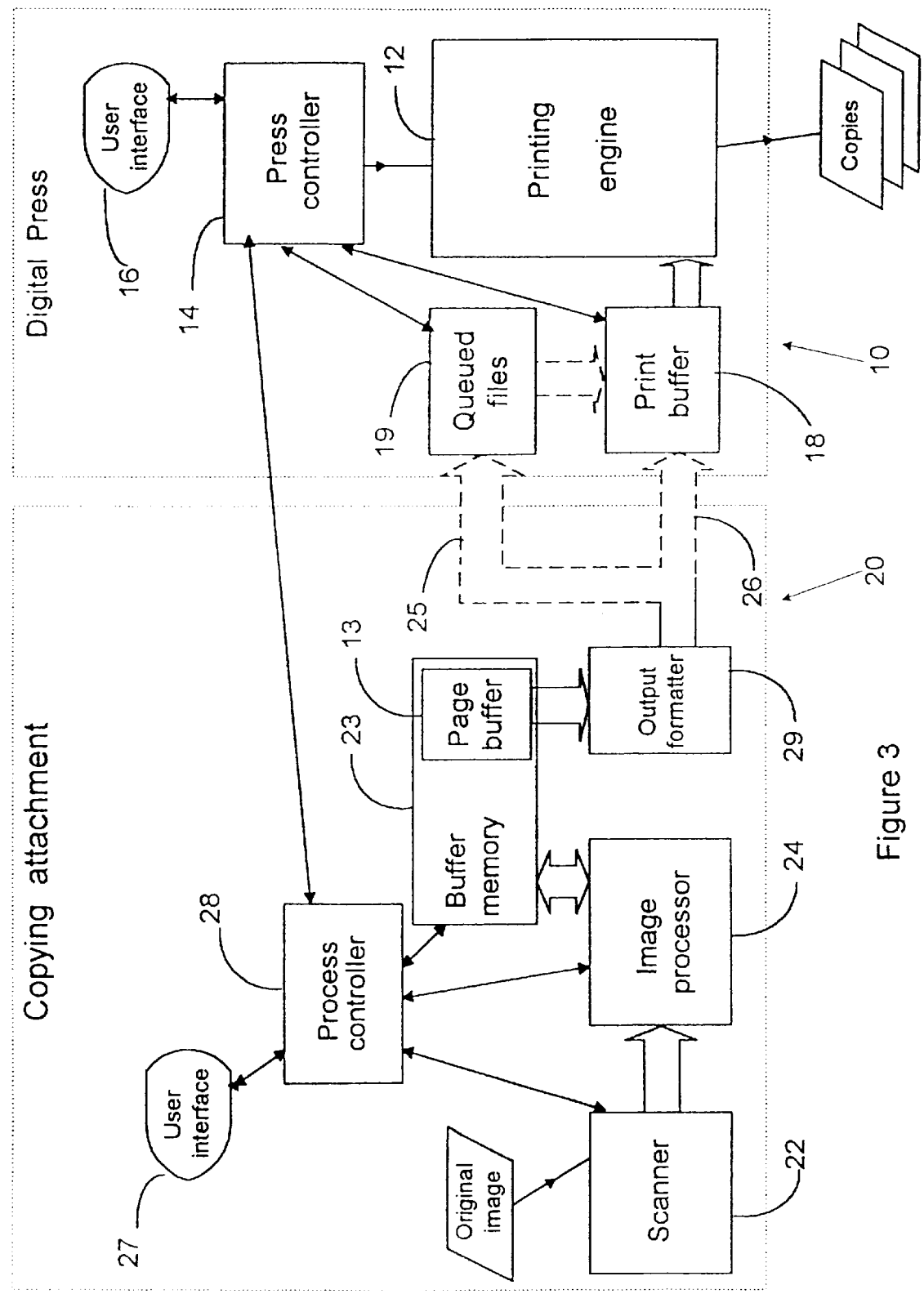
FIG. 3 is a block diagram of one configuration of a reproduction system according to the present invention.

Referring now to the drawings, FIG. 3 illustrates, in block diagram, the basic structure of one configuration of the system of the present invention. In this configuration, the system is realized as a copying attachment 20 that is connected to an existing digital press 10, such as Xeikon DCP1, available from Xeikon N.V., Vredebaan 72, Mortsel, Belgium. Preferably, the copying attachment is mechanically separate from the digital press. Typically, digital press 10 includes a printing engine 12, a print buffer 18, a queued files storage 19 and a press controller 14. The latter may also be associated with a user interface 16 for operator intervention with the functioning of the press. Print buffer 18 normally holds the data for a complete color image of a printed page (or of a pair of pages, in the case of a duplex press), in a format that is optimized for fast transfer to the printing engine. Optionally, print buffer 18 may hold the data for several consecutive pages, so that each printed copy will have these pages already collated. The image data are repeatedly sent to printing engine 12, once for each printed copy, where they are converted to signals that modulate the marking device therein so as to properly mark the image to be imprinted on the copy medium. The printing engine and the marking device may be any of a variety of types, based on various technologies—notably electrophotography (as in the Xeikon DCP1) and ink-jet. Queued files storage 19, which may be realizable as a RAM or a magnetic disc, holds the image data of a plurality of pages (or a plurality of collated groups of pages). When a new page image (or new group of collated pages) is to be printed, the corresponding data are loaded from storage 19 to print buffer 18, and are then repeatedly fed to the printing engine, as described above. Press controller 14 acts to control and synchronize operation of the three modules mentioned above and to coordinate inputting of files to storage 19.

Under normal operation of digital press 10, namely as an output printer of a publishing system, page image files, in a raster format, are fed to storage 19, typically from a raster image processor (RIP) (not shown), which, in turn, obtains encoded image data from a publishing system, e.g. a DTP system, and converts them into a raster representation of complete page images.

Copying attachment 20 functions as an alternative source of complete page images in raster format. It basically consists of a scanner 22, an image processor 24 and a process controller 28. It also includes a buffer memory 23, a user interface 27, an output formatter 29 and, optionally, a file storage 25. Process controller 28 acts to control and synchronize the functions of the other modules, according to commands and parameters supplied to it by an operator through user interface 27. Scanner 22 is of the flatbed type, which can accept a large variety of original image-carrying media, and preferably of the single-pass configuration, that is—such that scans in all three primary colors simultaneously. It preferably is equipped to scan reflective media, but may optionally also be able to scan transparent image-carrying media, such as photographic transparencies (including negatives). Also optionally, scanner 22 is provided with an automatic document feeder. The quality of the scanner, in terms of the resultant images, preferably matches that of the digital press. Digital image data resulting from scanning an original, which usually consist of values of all pixels in each of the three primary colors—red, green and blue (RGB)—are processed by image processor 24, in a continuous manner to be described herebelow, and are fed to one section 13 of buffer memory 23, where they are accumulated, possibly to form a complete digital representation of a printed page image. Throughout this procedure, intermediately processed data are possibly held in one or more other sections of buffer memory 23. It is, however, a feature of the present invention that nowhere within the copying attachment (or, more generally, within the ICS preceding the printer) are image data necessarily stored as files (i.e. as data manageable or retrievable by the operator). Moreover, in the basic mode of operation (as will be described herebelow), there is not even one complete image represented in storage, other than the final printed page image, mentioned hereabove. This feature notwithstanding, there is optionally provided, as additional service to the user, an auxiliary file storage facility. Printed page image data, are finally fed from buffer memory section 13, through output formatter 29, to digital press 10. It is noted that all image data, throughout all processing and outputting stages, remain raster oriented.

Output formatter 29 formats the image data to conform with the particular raster format required in the print buffer of the digital press. This usually includes separation into the specific data for the ink (or toner) colors (e.g. cyan, magenta, yellow and black, or CMYK), resampling to the spatial frequency (resolution) of the printing engine, halftone screening (where required) and, possibly, data compression.

The thus formatted page image data are applied to digital press 10 in either of two output paths, as shown by the dashed wide arrows in FIG. 3. Each path requires that the hardware in which the system resides be equipped with a suitable interface. A first output path 25 leads to file storage 19, where the data for each page are stored as a file in a queue (generally intermingled with files that originated from the publishing system), ready to be automatically loaded to print buffer 18, under control of press controller 14. There are two queuing modes: In one mode, the place(s) of these image data in the queue are negotiated between process controller 28 (which, in turn is controlled and supervised by the operator of the copying attachment) and the queue controlling module within press controller 14 (the usual order being according to time of data arrival). In the other mode, image data from the copying attachment has highest priority and, after becoming ready, is loaded to the print buffer as soon as the current printing job is finished and cleared from the print buffer, whereupon it is immediately printed. This first output path is usually realizable with a standard network communication system, such as Ethernet.

The second possible output path 26 leads directly to print buffer 18 and usually involves physical connection to a bus, to which the print buffer is attached. This path is particularly suitable for operation in the second of the queuing modes described above. Outputting the data to Print buffer 18 is coordinated between process controller 28 and press controller 14 so that it not interfere with the printing of a current page. The second path is operationally advantageous over the first path, since it shortens the time to printing the first copy (requiring one less transfer of complete data); it is, however, more complicated—in terms of the interface hardware and of the coordinating functions in the software of both controllers—and is therefore generally more costly. Conceptually, there also is a third possible path, namely a direct path to printing engine 12, which may even further shorten the time to copy. In this case, however, the copying attachment must include a print buffer and must emulate all the pertinent printing engine control functions, while intimately communicating with the printing engine, through a channel with a very wide bandwidth, and with the press controller—all of which make such a path complex and costly. Moreover, since the copying attachment is preferably designed to be attachable to a variety of printing devices, such a path, which must be custom designed for each device, may prove to be impractical.

Image processing, which, as mentioned hereabove, is carried out by image processor 24 in an automatic and integrated sequence, includes several categories of functions. The basic and generally necessary functions, in addition to the output formatting functions mentioned hereabove (namely, separation by ink colors, resampling to printing engine resolution, halftone screening and, possibly, data compression), are image sharpening and color transformation. Image sharpening corrects for blurring effects caused by the scanner and, optionally, also for imperfections in the original image and is aimed at optimizing the sharpness of the printed copies. The process can use digital sharpening algorithms, such as convolution filtering, well known in the art. Preferably, parameters governing the sharpening process are manually or automatically set to be optimal for any particular type of an original image, such as a continuous tone picture, text or graphical drawings, the latter two generally requiring a higher degree of sharpening than the first one. Optionally, these parameters may be set differently for corresponding image types appearing within any one page.

The object of color transformation is to correctly transform the representation of any color from that output by the scanner (namely RGB values, as mentioned hereabove) to values that correspond to densities of the various inks (or toners) used by the printing engine. The term "correctly transform", used above, means that the transformation is such that the colors in the printed copies will closely resemble the colors of corresponding areas in the original image. Such a transformation is generally possible (subject to certain constraints) and is preferably carried out with the aid of standard color management tools, which are generally available in the industry—for example, from Color Solution, Inc., 120 Birmingham Drive, Cardiff by the Sea, Calif. Such tools include colorimetric characterization of the scanner, in relation to different types of original media, and of the printer, to form respective profiles, and combining such profiles into a transform table.

Other processing functions may be required for certain types of images or for special copying requirements, to wit:

When the original medium carries an image that has been printed by a press, such as an offset press, the image usually has a halftone screen pattern. If this pattern were retained in the printable output image, it could interfere with the halftone screen being imposed in the present system—which would result in moire patterns. Therefore it is desirable to remove the halftone pattern from the scanned data, which can be done by appropriate filtering, as is known in the art.

In general, all the image processing parameters are set so that the copies appear to be as close to the original as possible. Sometimes, however, the original may be inferior in quality and it may be desirable to improve the image in the copies. Such improvement may involve correction of brightness, of contrast or dynamic range, of color balance, of tone scale, of color saturation, etc.—all using techniques well known in the context of DTP. Appropriate parameters to effect such correction may be set by the operator, through user interface 27 or they may be generated automatically by statistical analysis of the image. Such parameter setting, whether manual or automatic, may be aided by viewing, and interacting with, a digital low-resolution version of the image, called preview and obtained during a pre-scan.

Another often desirable change in the image is size change—either enlargement or reduction. Here again, appropriate parameters are set through the user interface and the image data are processed accordingly, to effect the size change, using well known methods. Yet another function affecting the geometry of the reproduced image that is made available in the system, by well known means, is that of positioning the image within the copy page. Possibly several replication of the image, or several different images from consecutive scans, may be placed within any one page. All such geometric specifications for the reproduction may, again, be aided by interaction with a pre-scan image.

Although all processing functions mentioned above may use well known techniques, it is characteristic of the present invention that they are carried out automatically, as one integrated process within a single computer, operating on a continuous flow of image data. The latter phrase means that image data are not stored as intermediate files, but are obtained directly from the scanner and stored only temporarily in sections of buffer memory 23, as chunks of data in process, in a manner that is automatic and transparent to the operator. The term "automatically" hereabove means that the entire operation of the system, from scanning through processing to printing, once started upon command from the operator, proceeds without further intervention by the operator. If the scanner is provided with an automatic document feeder, such automatic operation may extend over several documents.

Buffer memory 23 is preferably realized as a RAM, but it may also include other storage means, such as magnetic discs, to temporarily store overflow data. Optionally, the printing phase of the operation (that is, the transfer of data into print buffer 18 and the actual printing) may be made to be controllable by the operator—by manipulating the queue or by directly controlling the press—all of which is preferably carried out through user interface 27 and process controller 28 in the copying attachment.

Figure 7:
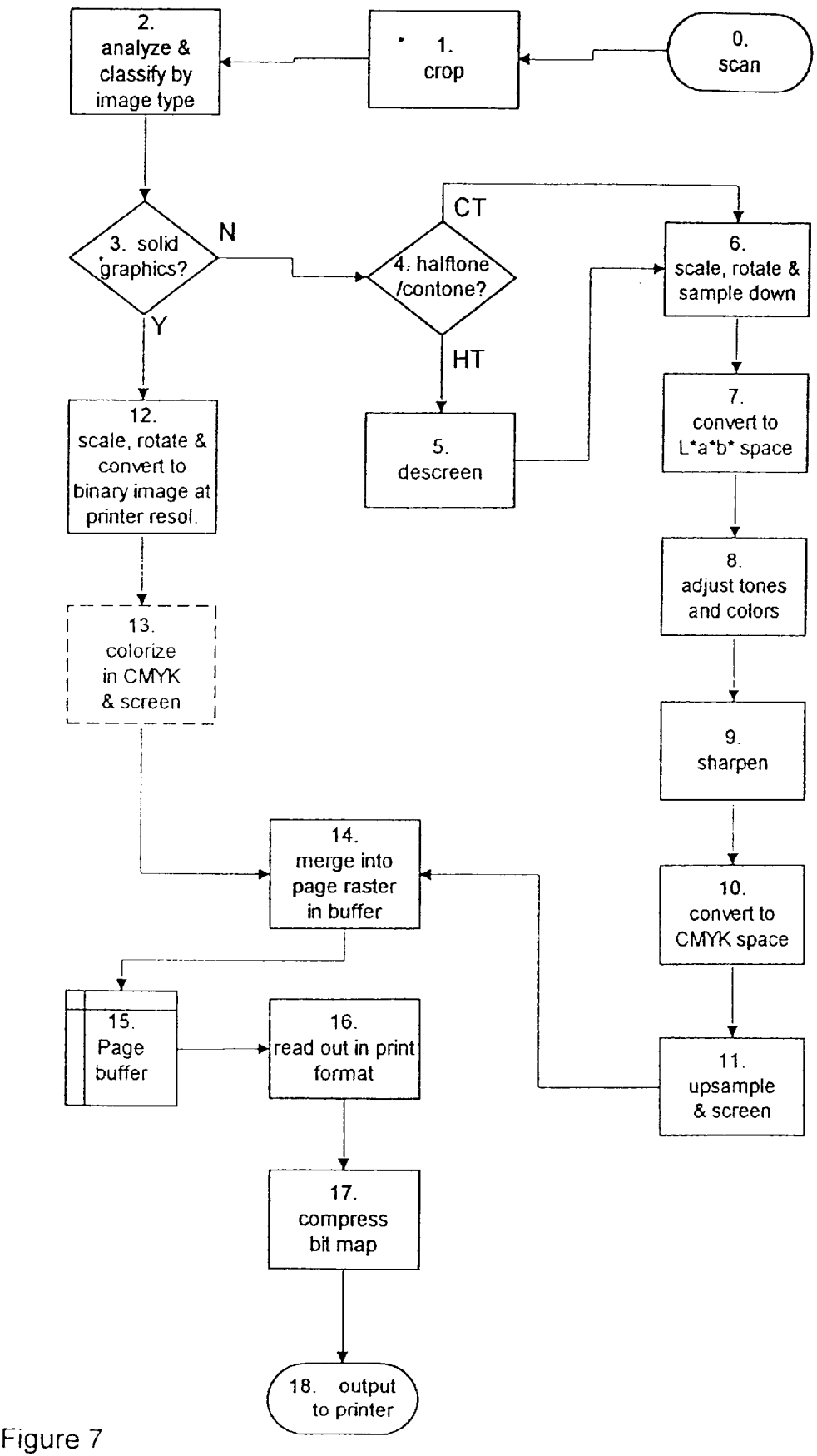
FIG. 7 is a flow diagram of a typical sequence of image processing functions according to the present invention.

The integrated sequence of processing functions is optimized for resultant image quality, as well as for overall processing speed, and is determined and managed by process controller 28. A typical processing sequence (encompassing functions from both operating modes—see description herebelow) is shown, as an exemplary flow diagram, in FIG. 7, where tasks are referenced by numbers. The original image is (0) scanned at a relatively high resolution and (1) cropped to the specified window. The resultant data is then (2) analyzed within image sections, each section being classified as to whether it is (3) solid graphics (such as text or so-called line art), or (4) a halftone or continuous tone image. In case of solid graphics, the image is scaled (12) and possibly rotated (according to specified scale- and orientation parameters) and converted to binary representation at printer resolution. It is then optionally (13) colorized (e.g. to specified CMYK values) and half-tone screened. If the original image section is half-tone (HT), it undergoes (5) a descreening process and then, like a continuous tone (CT) image section, is (6) scaled and possibly rotated (similarly to the solid graphics image) and possibly sampled down to a lower resolution. Subsequently the data are (7) converted to a uniform psychophysical color representation, such $L^*a^*b^*$, then (8) tones and colors are optionally adjusted (according to specified parameters, or according to an automatic analysis process, not shown). The image is then (9) sharpened and the data are (10) converted to printing ink values. Subsequently the image is (11) up-sampled to full printing resolution and half-tone screened. The screened raster data for all three image section types are then (14) merged and properly positioned within the raster of the full page image and (15) stored in the page buffer. Upon a load signal, the page image is (16) read out from the buffer, in a format required by the printer and (17) compressed accordingly, then (18) output to the printer. It is noted that in the above example, automatic image segmentation is employed (task 2). In cases where the whole original image is primarily of one type, the operator would indicate the type and a simplified processing sequence would ensue. For example, if there are only graphics, the sequence would include only tasks 0, 1, 12, 13 (optionally) and 14–18. If, as another example, the original image is primarily halftone, the invoked tasks would be 0, 1, 5–11 and 14–18; in this case the scanning may be at a lower resolution. It is noted that for each type of original image, there is an optimal processing sequence; a limited number of such sequences are stored in the copy controller and one of them is selected and invoked according to the current image type (and governed by parameters, which possibly have been set as appropriate for the particular image).

It is noted that, to the extent permitted by the computer hardware and operating system, several processing functions may be carried out virtually simultaneously, using multi-processing functions may be carried out virtually simultaneously, using multi-processing and/or multi-threading methods. Moreover, these virtually simultaneous processes may operate on different sections of one image or on different images (e.g. sequentially scanned images). Furthermore, processing of one or more images may take place simultaneously with scanning of one of the images (processing one section thereof while another section is being scanned) or of another image (e.g. the next one in sequence); thus a number of images may be simultaneously in process, in a pipeline manner. It is further noted that all these processes may take place while yet another image (or group of images, in the case that several images are composed into a single page) is being printed. These workflow capabilities are managed by process controller 28 and are a particular feature of the present invention.

As already mentioned, parameters for the scanning and the various processing functions may be either preset or automatically adjusted or set and adjusted by the operator. All such setting and adjusting by the operator is carried out by means of user interface 27, which preferably is a graphic user interface (GUI), utilizing a display device and GUI software. Also as mentioned, operation of the system, including sequencing the image processing functions and managing the data flow, are controlled by process controller 28, again—according to preset or altered parameters. Image processor 24 and process controller 28 are embodied as packages of software (or as combinations of software and special hardware components), which, alongside inter alia the user interface software, run on a single computer (which may be equipped with multiple, possibly specialized, processors), all of which are optimized for the task; this is another feature of the present invention.

Preferably, two primary modes of operation are provided—basic mode and advanced mode. In the basic mode, operation is similar to that of an office copier, in that the operator enters a few basic parameter values, such as number of copies to be printed, enlargement- or reduction factor and basic classification of the original document, i.e. the type of medium (such as transparency, photographic print or regular print) and the prevalent character of the image (e.g. color picture, text, drawing or a combination thereof).

In the advanced mode, the operator can specify certain adjustments to the image and certain geometric relations between the original image and its reproduction on the printed sheet. Adjustments to the image, which can be applied overall or to regions within the image, either for correction of imperfections in the original or for deliberate effects, may affect various aspects of the image, such as color balance, tone scale, saturation, sharpness and contrast. Specifiable geometric relations include cropping, exact scaling, positioning and rotating, multiple copies on a page, division of a large image into several pages and combinations of several images (from separate scans) on a page; in case of a duplex press, allocation of consecutive images to the two sides of a sheet may be specified.

It is characteristic to the present invention that all such specifications and parameter settings, even in the advanced mode (with certain exceptions, noted below), are completed before a "copy" command is issued, at which point of time image scanning and its processing commences automatically, as described hereabove. However, as part of the parameter specification procedure in the advanced mode, a pre-scan may sometimes be made, usually at a much lower resolution, and the resultant data displayed as an image on the screen of the user interface; the operator may then specify certain parameters and adjustments by graphical interaction with this image—all in a manner, and with tools, known in the practice of DTP. It is noted, though, that, in contradistinction to DTP systems, such interactive procedures do not directly operate on the image data used for reproduction and, as mentioned, they are carried out in their entirety prior to commencement of the scanning operation that yields the reproduction data. It is, further, characteristic to the present invention that no data for a complete image as such is intentionally accumulated anywhere prior to the final printed page image in buffer memory section 13. Nevertheless, such image data may occasionally accumulate in buffer memory 23; this may occur, for example, when processing lags behind scanning or printing lags behind processing; another notable case is when images from several originals are to be combined into a single printed page image, for which case scan data from all images must be stored prior to the combining process. Characteristically, through, any such accumulation is temporary and not usually known to the operator, who, therefore, need not, and cannot interact with such accumulated image data. Under certain circumstances, even the page buffer need not contain a complete page image, but data may be accumulated, to form a complete page image representation, only in the print buffer of the printer.

A job management service, built into process controller 28 and user interface 27, enables inter alia scanning a number of images in a sequence—to be combined into a page image or to form a sequence of printed pages, when such a sequence is automatically handled by the press, such as a duplex pair or a digitally-collated group of pages (all held together in the print buffer). In the case that the scanner is equipped with a document feeder, automatic reproduction of a group of documents is likewise enabled by such a job manager. Generally, the above-mentioned rule, that all scanning- and processing parameters are set by the operator before full image scanning commences, may be extended to include such a sequence of scans. A notable exception to this extension occurs when the operator opts to set parameters for any one image in an interactive fashion, in which case it is more convenient to perform the required pre-scan just before the full scan (thus requiring placing of the original document on the scanner only once).

It is also noted that operation in the basic mode does not require that the operator have any particular skills, yet enables high-quality reproduction, limited only by the quality of the press. Furthermore, even operation in the advanced mode does not require the operator to have the level of skills usually required of a digital press operator or of a graphic arts professional.

Typical operational procedure is as follows: Initially, press controller 14 is set, through user interface 16, to a certain queuing arrangement (if the copying attachment is configured with the first output path) or certain interruption conditions (if the copying attachment is configured with the second output path) for copied images. To copy a document, the operator places it on the document table of scanner 22, in a mechanically proscribed position. If using the basic mode, the operator enters on user interface 27 the desired copying parameters, then presses, or clicks, the "copy" button. This causes a scan command to be issued. Thereafter the system operates autonomously—scanning, processing and transferring data to digital press 10, which thereupon prints the desired number of copies. If using the advanced mode, the operator either enters additional parameters, as desired, or clicks a "prescan" button, whereupon the document is prescanned, that is—scanned at relatively low resolution, and a resultant image is displayed as a preview image on an image display screen normally forming part of user interface 27. In the latter case, the operator performs interactive operations on this image, such as color adjustments, cropping, sizing and positioning within the reproduction sheet, all of which, in effect, specify or modify scanning- and processing parameters. He then clicks the "copy" button and operation proceeds as in the basic mode.

Parameters may be left set from one document to the next or may be stored for recall later. It is also possible to set parameters for a consecutive series of documents. In this case, the procedure would be to first set the parameters for such a series, using the basic mode, and then alternately place a document on the scanner and click "copy". This procedure can be run automatically if the scanner is equipped with the optional document feeder.

Figure 4:
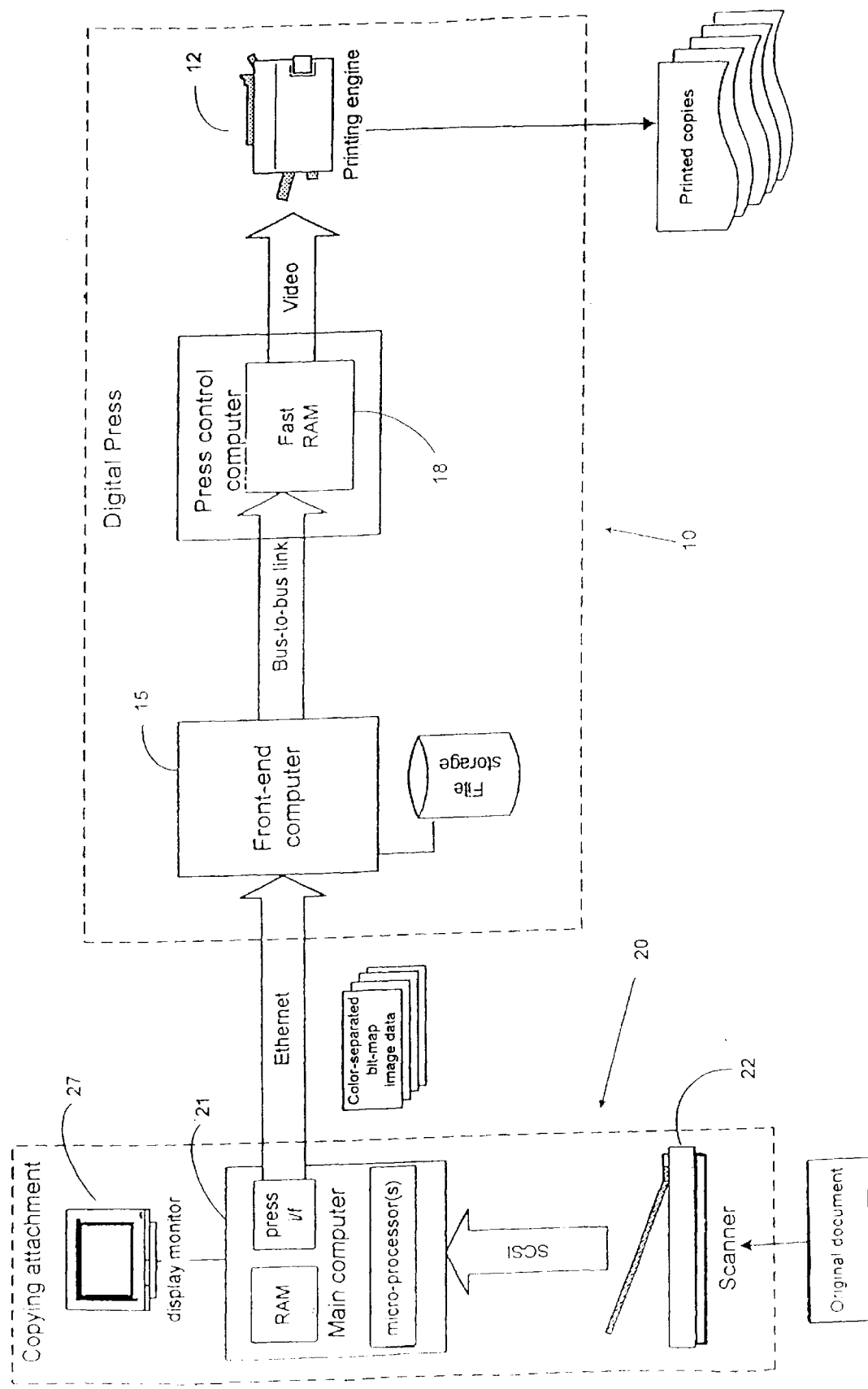
FIG. 4 is a schematic block diagram of a preferred embodiment of the configuration of FIG. 3.
Figure 8:
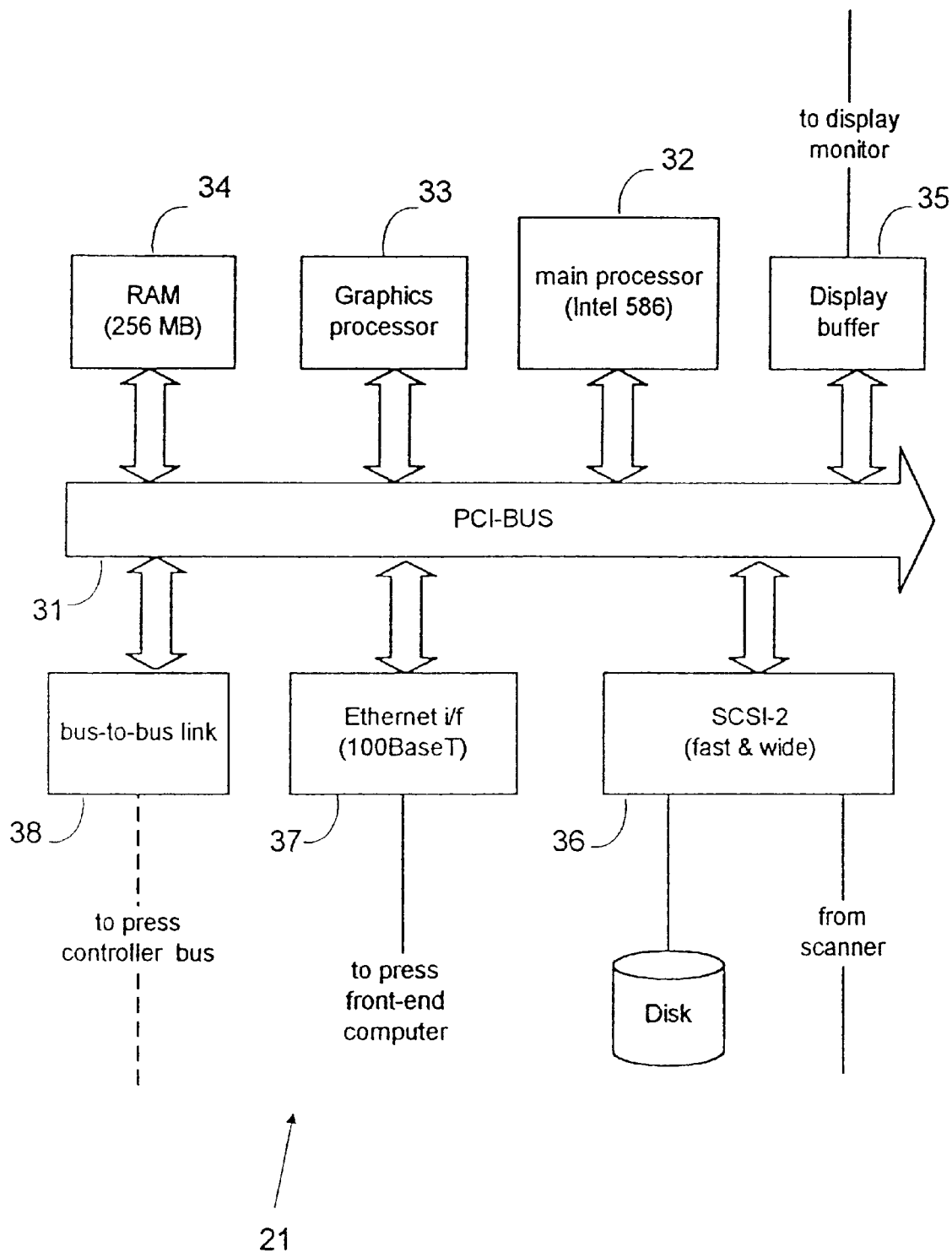
FIG. 8 is a schematic block diagram showing the computer in the embodiment of FIG. 4 in greater detail.

FIG. 4 shows a preferred hardware embodiment of the Copying Attachment configuration 20, described hereabove, and the manner of interfacing it to a typical digital press 10 (using the first output path 25 of FIG. 3). Here, a flatbed scanner 22, such as Scanmaster 2500, available from Howtek, 21 Park Ave., Hudson, N.H., is connected, by means of a fast and wide SCSI-2 network, to a general purpose computer 21. Computer 21, which is depicted in greater detail in the block diagram of FIG. 8, is based on a PCI bus 31 and includes one or more main micro-processors 32, preferably of the general-purpose type, such as Pentium [R] by Intel Corp. It also includes a large RAM 34, which serves primarily for buffer memory 23, including page buffer 13, (FIG. 3) and is extended by a magnetic disc system (not shown). Additionally, computer 21 may include one or more fast graphics processors 33, to increase image processing speed. Micro-processors 32 and graphics processors 33, if present, which together serve as the basic hardware for image processor 28, are preferably conventional integrated-circuit devices, i.e. are generally known and commercially available; however, custom components may prove advantageous in certain configurations. A display monitor 27' is connected to a display buffer 35 in the computer; also connected are a keyboard and a pointing device (e.g. mouse) (both not shown), all of which serve for user interface 27. The computer's connection to the scanner is via SCSI board 36. Scanner 22 and computer 21 are housed within a single enclosure, on which also the user interface devices are conveniently mounted. A press interface card within computer 21 is a fast Ethernet adapter 37 and serves to connected Copying Attachment 20 to the digital press. The latter is connected to the Ethernet through its front-end computer 15 (which normally accepts coded graphic data from publishing systems and serves primarily as a RIP). In conjunction with a magnetic disc file storage, front-end computer 15 serves to store queues raster-formatted page image files (19 in FIG. 3). It is noted that the data output by Copying Attachment 20 is already thus formatted. Print buffer 18 is usually realized as a specially configured fast RAM 39, residing in a separate press-control computer 33, which is connected to front-end computer 15 by means of a SCSI network or a bus-to-bus link. Image data from fast RAM 39 is supplied to printing engine 12 via a wide-band path, marked in the drawing as "video". It is noted that the second path for connecting the Copying attachment to the digital press (26 in FIG. 3) may be realized, as shown by a dashed line in FIG. 8, using an appropriate bus-to-bus link, connected, at one end, through link card 38, to PCI-bus 31, and, at the other end, through another link card (not shown)—to the internal bus of press control computer 33.

Another possible configuration of the present invention is similar to that of FIGS. 3 and 4, except that scanner 22 is housed separately from computer 21. In one preferred embodiment, in which output path 1 (25 in FIG. 3) is used, both latter hardware components are shared with other applications, such as DTP applications. In this embodiment, the system of the present invention is realized primarily as a package of software, residing in computer 21. In another preferred embodiment, shown in FIG. 5, in which output path 2 (26 in FIG. 3) is used, the functions of computers 21 and 15 (FIG. 4) share a single common computer 30. Scanner 22 and display monitor 27' are connected to computer 30, in which also resides the software package that embodies the system of the present invention and which may be fortified by additional processors, as in the first described configuration. In operation, computer 30 is switched between two modes: In a "RIP" mode, it serves to rasterize graphic data from publishing systems (which is its traditional function) and in a "copy" mode it serves to copy physical original documents according to the present invention.

In all the configurations described hereabove, a digital press is indicated as the printing system. It is noted that the digital press, as such, is not part of the present invention. Thus any other printing system may be utilized, with obvious appropriate modification of the interface thereto. For example, in one particular variation of the first-described configuration (not shown), the digital press is replaced by a so-called digital offset press, which is an offset press that is equipped to record a raster image, obtained from a digital source, as a latent image onto a printing form on the press (such as a lithographic plate mounted on a cylinder), which form is already in position for printing.

Figure 5:
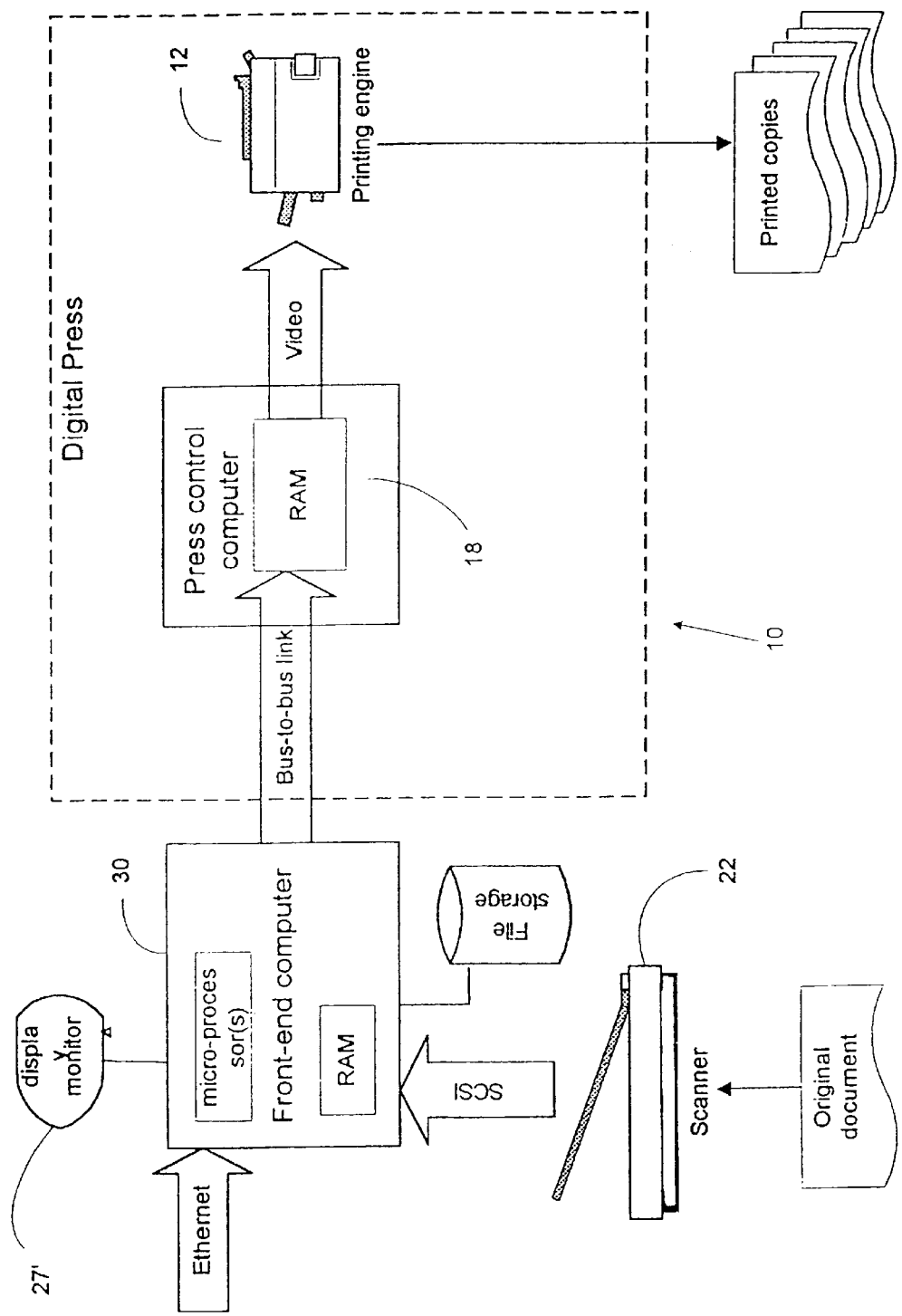
FIG. 5 is a schematic block diagram of a preferred embodiment of an alternative configuration of the system of the present invention.
Figure 6:
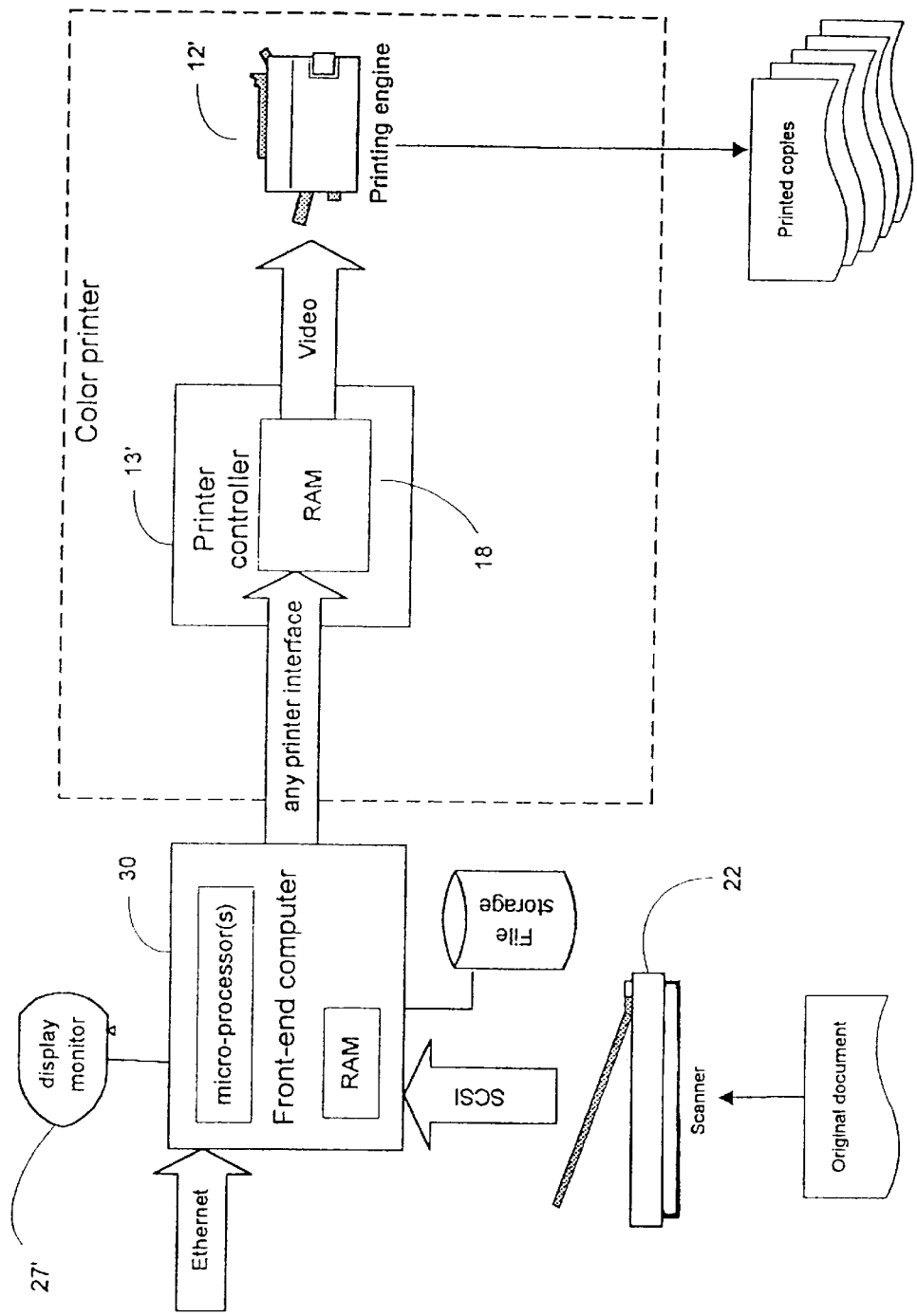
FIG. 6 is a modification of FIG. 5, showing another alternative configuration.
Figure 9:
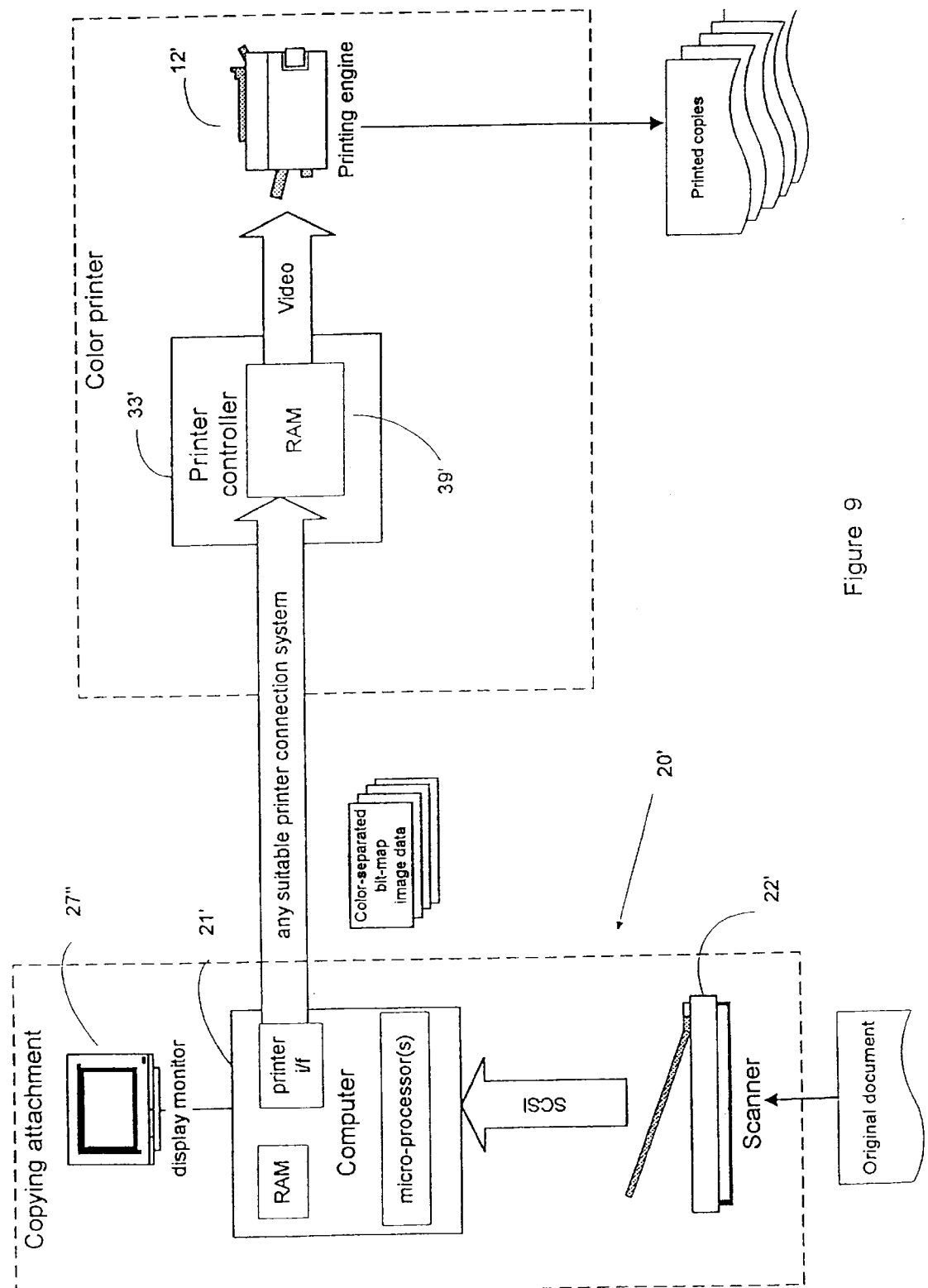
FIG. 9 is a modification of FIG. 4, showing yet another alternative configuration.

Another alternative configuration, shown in FIG. 6, is a modification of that of FIG. 5, whereby the digital press 10 is replaced by a digital color printer 10'. The printer may be of any type with acceptable characteristics, such as a so-called office printer and may utilize any of a variety of printing technologies, such as electrophotography and ink-jet. Here, print buffer 18 resides in RAM 39' that is part of a printer controller 33' and it accepts the raster-formatted image data from front-end computer 30 through any suitable wide-band communication link, such as a parallel interface printer interface or a SCSI network. Yet another alternative configuration is shown in FIG. 9, which is a modification of that of FIG. 4, whereby printing is carried out by a digital color printer (as in the configuration of FIG. 6). Here again, a copying attachment 20' includes, preferably in a single mechanical package, a scanner 22', a digital processor 21' and a display device 27'. Digital processor 21' is preferably a specially designed module; it, and the software residing therein, are optimized to carry out the control and image processing functions outlined above with respect to the first configuration most efficiently and at the least cost.

While the invention has been described with respect to a limited number of configurations and embodiments, it will be appreciated that many variations, modifications and other applications of the invention may be made.

What is claimed is:

1. An attachment to a digital printer for reproducing an original physical image, all or portions of which are classifiable into a finite number of types, the printer being operative to print multiple copies of a page image represented by digital image data formatted according to a print raster, the attachment being housed separately from the printer and comprising— a scanner and a digital computer, connected to said scanner and connectable to the digital printer and including storage, wherein said computer is programmed to receive a copy command from an operator and thereupon to automatically, cause said scanner to scan the original image, process image data resulting from said scanning so as to obtain a complete digital representation of a page image, cause said representation to be transferred to the printer in a raster format that corresponds to the print raster, and cause the printer to print said page image;

and wherein said processing of image data is carried out automatically according to a set procedure, which includes at least a first and second subprocedure, in sequence, each associated with parameters, none of said parameters being alterable during said processing, said first subprocedure including processing associated with any single original image and said second subprocedure including processing associated with any single page image;

and wherein said first subprocedure is divided into a plurality of paths, each corresponding to one of said types, and said processing of data from the original image or from any portion thereof is carried out along the one of said paths that corresponds to its type.

2. The attachment of claim 1, wherein any of said parameters are set automatically prior to said processing.

3. The attachment of claim 1, wherein the original image or portions thereof are automatically classified into respective types prior to said processing.

4. The attachment of claim 1, wherein at least one of said types is solid graphics and image processing according to the corresponding one of said paths includes processing of binary valued data.

5. The attachment of claim 1, wherein said second subprocedure is operative to cause the page image to include a version of each of a plurality of original images or a plurality of copies of an original image.

6. The attachment of claim 1, further comprising an image display means and operator input means and wherein said computer is further programmed to be operative to display an image on said image display means, and to be responsive to said operator input means, so as to enable the operator to set one or more of said parameters interactively with said displayed image prior to said processing.

7. The attachment of claim 6, wherein said displayed image is a preview version of the original image.

8. The attachment of claim 6, wherein said displayed image is a geometric representation of the page image to be printed.

9. The attachment of claim 1, wherein said digital printer is a digital press.

10. The attachment of claim 1, wherein said digital printer is a press with a provision for on-press recording of images onto printing forms.

11. The attachment of claim 1, further comprising a housing, wherein said scanner and said computer are housed in common in said housing.

12. The attachment of claim 1, wherein said computer is a general-purpose computer and said programming is effected entirely by a specially designed integrated software package.

13. The attachment of claim 1, wherein said scanning of any one image may occur simultaneously with said processing of data of at least one other image.

14. A system for reproducing physical original images as printed copies, any original image or portions thereof being classifiable into a finite number of types, comprising—
   a digital computer, including storage,
   a scanner, connected to said computer, and
   a digital printer, connected to said computer and housed separately from said scanner and said computer and operative to receive digital page images, in print raster format, and to print multiple copies of any such page image in a plurality of printing colors;
wherein said computer is programmed to automatically, after receiving a copy command from an operator,
   cause said scanner to scan an original image,
   process resultant image data so as to obtain a complete digital representation of the page image,
   cause said representation to be transferred to said printer as a page image in said print raster format, separated by printing colors, and
   cause said printer to print the page image;
and wherein said processing of image data is carried out in its entirety according to a set procedure, which includes at least a first and a second subprocedure, in sequence, each associated with parameters, none of said parameters being alterable during said processing,
   said first subprocedure being associated with any single original image and
   said second subprocedure being associated with any single page image;
and wherein
   said first subprocedure is divided into a plurality of paths, each corresponding to one of said types, and
   said processing of data from the original image or from any portion thereof is carried out along the one of said paths that corresponds to its type.

15. The system of claim 14, wherein any of said parameters are set automatically prior to said processing.

16. The system of claim 14, wherein the image or portions thereof are automatically classified into respective types prior to said processing.

17. The system of claim 14, wherein at least one of said types is solid graphics and image processing according to the corresponding one of said paths includes processing of binary valued data.

18. The attachment of claim 14, wherein said second subprocedure is operative to cause the page image to include a version of each of a plurality of original images or a plurality of copies of an original image.

19. The system of claim 14, further comprising an image display means and operator input means and wherein said computer is further programmed to be operative to display an image on said image display means, and to be responsive to said operator input means, so as to enable the operator to set one or more of said parameters interactively with said displayed image prior to said processing.

20. The system of claim 19, wherein said displayed image is a preview version of the original image.

21. The system of claim 19, wherein said displayed image is a geometric representation of the page image.

22. The system of claim 14, wherein said printer is commercially supplied, and operable, independently from said scanner and said computer.

23. The system of claim 14, wherein said computer is connected to said printer by means of a standard interface or network.

24. The system of claim 14, wherein said digital printer is a digital press.

25. The system of claim 14, wherein said digital printer is a press with a provision for on-press recording of images onto printing forms.

26. The system of claim 14, further comprising a housing, wherein said scanner and said computer are housed in common in said housing.

27. The system of claim 14, wherein said computer is a general-purpose computer and said programming is effected entirely by a specially designed integrated software package.

28. The system of claim 14, wherein said scanning of any one image may occur simultaneously with said processing of data of at least one other image and simultaneously with said printing of a page containing data from one or more yet other images.

29. A method for reproducing a physical original image as printed copies, by means of a digital printer, the original image, or portions thereof, being classifiable into a finite number of types, the method comprising the steps of—
   (a) providing a digital computer, including storage and user interface means, and a scanner, all being housed separately from the printer, and connecting the scanner to the computer;
   (b) connecting the computer to the printer;
   (c) programming said computer to automatically, after receiving a copy command from an operator—
   cause the scanner to scan the original image,
   process resultant image data so as to obtain a complete digital representation of a page image, cause said representation to be transferred to the printer in a raster format, separated by printing colors, and cause the printer to print the page image; and (d) programming the computer and the user interface to enable an operator to set any parameters, affecting the page image, prior to issuing said copy command;

wherein said processing of image data is carried out in its entirety according to a set procedure, which includes at least a first and a second subprocedure, in sequence, each associated with parameters, none of said parameters being alterable during said processing, said first subprocedure including processing associated with any single original image and said second subprocedure including processing associated with any single page image;

and wherein— said first subprocedure is divided into a plurality of paths, each corresponding to one of said types, and said processing of data from the original image or from any portion thereof is carried out along the one of said paths that corresponds to its type.

30. The method of claim 29, wherein any of said parameters are set automatically prior to said processing.

31. The method of claim 29, further comprising the step of automatically classifying the original image or portions thereof into respective types prior to said processing.

32. The method of claim 29, wherein at least one of said types is solid graphics and image processing according to the corresponding one of said paths includes processing of binary valued data.

33. The method of claim 29, wherein said second subprocedure is operative to cause the page image to include a version of each of a plurality of original images or a plurality of copies of an original image.

34. The method of claim 29, wherein said scanning of any one image may occur simultaneously with said processing of data of at least one other image.

35. The method of claim 29, wherein said printer is a digital press.

* * * * *

UNITED STATES PATENT AND TRADEMARK OFFICE
CERTIFICATE OF CORRECTION

PATENT NO.   : 6,069,707

DATED        : June 6, 2000

INVENTOR(S)  : Belias et al

It is certified that error appears in the above-identified patent and that said Letters Patent is hereby corrected as shown below:

In claim 2, column 4, line 56 through column 5, line 27 delete claim 2 as written and insert --The method of claim 1, wherein the first cut line is generally linear.-- therefor.

Signed and Sealed this

Tenth Day of April, 2001

Attest:

NICHOLAS P. GODICI

Attesting Officer

Acting Director of the United States Patent and Trademark Office